United States Patent
Wei et al.

(10) Patent No.: US 11,638,205 B2
(45) Date of Patent: Apr. 25, 2023

(54) APPARATUS AND METHOD FOR OBTAINING SLICE-SUPPORT INFORMATION

(71) Applicant: HUAWEI TECHNOLOGIES CO., LTD., Guangdong (CN)

(72) Inventors: Qing Wei, Munich (DE); Ömer Bulakci, Munich (DE); Henrik Olofsson, Kista (SE)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 16/869,963

(22) Filed: May 8, 2020

(65) Prior Publication Data

US 2020/0267639 A1   Aug. 20, 2020

Related U.S. Application Data

(63) Continuation of application No. PCT/EP2017/078792, filed on Nov. 9, 2017.

(51) Int. Cl.
*H04W 48/18* (2009.01)
*H04W 76/11* (2018.01)
(Continued)

(52) U.S. Cl.
CPC ............ *H04W 48/18* (2013.01); *H04W 8/08* (2013.01); *H04W 48/16* (2013.01); *H04W 76/11* (2018.02)

(58) Field of Classification Search
CPC ..... H04W 48/18; H04W 48/16; H04W 48/00; H04W 76/00; H04W 76/10; H04W 76/11; H04W 8/00; H04W 8/08; H04W 36/0055; H04W 16/00; H04W 16/02; H04W 16/04; H04W 16/10; H04W 16/14; H04W 88/00; H04W 88/02; H04W 88/08; H04W 88/06;
(Continued)

(56) References Cited

U.S. PATENT DOCUMENTS 10,506,489 B2 * 12/2019 Vrzic ..................... H04W 36/26
10,582,432 B2 *  3/2020 Park et al. ............ H04W 36/08
(Continued)

FOREIGN PATENT DOCUMENTS

CN       106879009 A  *  6/2017  ............ H04W 24/02
CN       109168180 B  *  8/2017  ........ H04W 36/0011
(Continued)

OTHER PUBLICATIONS

ETSI MCC,"Report of 3GPP TSG RAN meeting #97,Berlin, Germany, Aug. 21-25, 2017",3GPP TSG-RAN WG3#97BIS R3-173466,Prague, Czech Republic, Oct. 9-13, 2017,total 126 pages.
(Continued)

*Primary Examiner* — Meless N Zewdu
(74) *Attorney, Agent, or Firm* — Womble Bond Dickinson (US) LLP

(57) ABSTRACT

Embodiment of the invention describe an apparatus for an access node, which is configured to receive slice-support information; and/or receive slice-context information and determine slice-support information based on the slice-context information; wherein the slice-support information comprises a mapping of a slice to an area, in particular a tracking area or a slice-support area; and process a slice-related information based on the slice-support information.

19 Claims, 12 Drawing Sheets

(51) Int. Cl.
*H04W 8/08* (2009.01)
*H04W 48/16* (2009.01)

(58) Field of Classification Search
CPC ..... H04W 88/14; H04W 72/04; H04W 72/14; H04W 72/1263; H04W 72/1257; H04W 72/0493; H04W 72/02; H04W 64/00; H04W 4/021; H04W 4/029; H04W 4/02; H04W 48/20; H04W 48/08; H04W 64/003; H04W 92/00; H04W 92/02; H04W 92/04
See application file for complete search history.

(56) References Cited

U.S. PATENT DOCUMENTS

| | | | | |
|---|---|---|---|---|
| 10,616,934 | B2* | 4/2020 | Talebi Fard et al. | H04W 76/11 |
| 10,764,789 | B2* | 9/2020 | Qiao et al. | H04W 28/24 |
| 10,805,168 | B2* | 10/2020 | Xu et al. | H04L 41/12 |
| 10,893,455 | B2* | 1/2021 | Zee et al. | H04W 36/32 |
| 2017/0367036 | A1* | 12/2017 | Chen et al. | H04W 48/16 |
| 2018/0132096 | A1* | 5/2018 | Huo | H04W 8/08 |
| 2018/0317163 | A1* | 11/2018 | Lee et al. | H04W 48/18 |
| 2019/0357131 | A1* | 11/2019 | Sivavakeesar et al. | H04W 48/18 |
| 2020/0015066 | A1* | 1/2020 | Zhu | H04W 8/06 |
| 2020/0015158 | A1* | 1/2020 | So | H04W 48/18 |
| 2020/0059987 | A1* | 2/2020 | Hong et al. | H04W 76/27 |
| 2020/0169921 | A1* | 5/2020 | Zhu et al. | H04W 28/26 |

FOREIGN PATENT DOCUMENTS

| | | | | |
|---|---|---|---|---|
| CN | 109561485 A | * | 4/2019 | ............ H04W 48/16 |
| WO | 2017135860 A1 | | 8/2017 | |
| WO | 2017171598 A1 | | 10/2017 | |
| WO | 2018184656 A1 | | 10/2018 | |

OTHER PUBLICATIONS

3GPP TS 38.423 V0.1.1 (Jun. 2017);3rd Generation Partnership Project;Technical Specification Group Radio Access Network;NG Radio Access Network(NG-RAN);Xn application protocol (XnAP)(Release 15);total 53 pages.

Ericsson,"Handling slice availability in connected mode",3GPP TSG-RAN WG3 #97 R3-173210,Berlin, Germany, Aug. 21-25, 2017,total 4 pages.

3GPP TS 23.502 V0.4.0 (May 2017);3rd Generation Partnership Project;Technical Specification Group Services and System Aspects;Procedures for the 5G System;Stage 2(Release 15);total 126 pages.

3GPP TS 38.413 V0.2.0 (Jul. 2017);3rd Generation Partnership Project;Technical Specification Group Radio Access Network;NG Radio Access Network(NG-RAN);NG Application Protocol (NGAP)(Release 15);total 81 pages.

3GPP TS 38.413 V0.1.0 (May 2017);3rd Generation Partnership Project;Technical Specification Group Radio Access Network;NG Radio Access Network(NG-RAN);NG Application Protocol (NGAP)(Release 15);total 80 pages.

* cited by examiner

APPARATUS AND METHOD FOR OBTAINING SLICE-SUPPORT INFORMATION

CROSS-REFERENCE TO RELATED APPLICATIONS

This application is a continuation of International Application No. PCT/EP2017/078792, filed on Nov. 9, 2017, the disclosure of which is herein incorporated by reference in its entirety.

TECHNICAL FIELD

Embodiments of the present invention relate to the field of wireless mobile communication and specifically to network slicing. In particular, Embodiments of the present invention relate to an apparatus and method for obtaining slice-support information for an access node, and a corresponding apparatus and method for an access-and-mobility management function (AMF) and/or an operations-and-management system (OMS), as well as a system thereof.

BACKGROUND

Network slicing concept is introduced in 3GPP 5G to address various requirements from multiple industries that use a shared network infrastructure. According to network slicing, network services can be customized based on the requirements of different use cases and thus can increase the network operation efficiency.

Due to diverse deployment and dynamic situations (e.g. load, resource, physical capabilities of wireless access nodes) in a 5G radio access network (RAN), some slices may be available only in a part of the network. When an active User Equipment (UE) moves, it may go to an area where the active session of its associated slice cannot be supported or is not available. This may result in the drop of a UE's active sessions and decrease the experience of the UE. Therefore, to ensure the service continuity of the UE, slice availability information at neighboring cells of the UE is of particular importance.

3GPP TS 38.423, "NR-RAN; Xn Application Protocol (XnAP) (Release 15)" defines that slice-support information can be exchanged and/or updated via an Xn setup and configuration message, in case of the existence of an Xn interface.

3GPP TS 38.413 v0.2 NG-RAN; NGAP June. 2017 specifies that a network can get (updated) slice information from a RAN node by an NG setup request or an gNB configuration update, as e.g. illustrated in FIG. 12.

However, in the prior art there is no solution as how to obtain slice-support information of a neighbor cell or area in case of the absence of the Xn interface.

SUMMARY

In view of the above-mentioned problems and disadvantages, embodiments of the present invention aim to improve conventional access nodes and core networks.

To this end, embodiments of the present invention provide an apparatus and a method for a RAN node to obtain the slice-support information of the neighboring cell or area either directly, or indirectly via data processing, for reliable and efficient UE mobility as well as for service continuity.

The invention further provides a corresponding apparatus and method for an AMF, and/or an OMS, as well as a system comprising both apparatuses.

The object of the present invention is achieved by the solution provided in the enclosed independent claims. Advantageous implementations of the present invention are further defined in the dependent claims.

In one embodiment, an apparatus for an access node is configured to receive slice-support information; and/or receive slice-context information and determine slice-support information based on the slice-context information; wherein the slice-support information comprises a mapping of a slice to an area, in particular a tracking area or a slice-support area; and process a slice-related information based on the slice-support information.

This ensures that sufficient information to determine which slice is available in which area can be obtained.

Slice-support information refers to a network slice or network slices in a certain area. It comprises information by which a slice can be directly identified, i.e. by an identifier.

Slice-context information comprises information that can be used to infer an identity of at least one network slice.

Slice-related information can be any information related to a slice, in particular any information related to the received and interpreted slice-support information and slice-context information.

The mapping can be an explicit mapping, e.g. an explicit relationship as represented by a look up table. Additionally or alternatively, the mapping can be an implicit mapping based on a prior rule, e.g. such that only one of the slice or the areas is explicitly mentioned in the slice-support information, but where it is predefined, i.e. clear for the apparatus, what the information is, which is not explicitly mentioned.

In one embodiment, the apparatus further can be configured to request slice-support information and/or slice-context information, in particular from a network entity and/or a UE.

This ensures that slice-support information can be obtained when it is needed, e.g. from a central node/function or from a UE that functions as a relay to a target access node, e.g., base station.

In one embodiment, the network entity (800) comprises an entity of the core network, an entity of the network management and/or an entity of the access network, in particular an access-and-mobility management function, AMF, an operations-and-management system, OMS, an operations-administration-maintenance function (OAM) and/or an access node.

In one embodiment, the slice-support information and/or the slice-context information can be received from a network entity, in particular via an N2 message.

In particular, this ensures that slice-support information can be obtained from a new N2 aka NG2 message or signal, or by using the fields of an existing N2 aka NG2 message or signal, or by adding new information element fields to an existing N2 aka NG2 message or signal.

In one embodiment, the slice-context information can comprise at least one of a slice support area, in particular a slice support area ID, a tracking area (TA) identity (TAI) list for a UE, an access node ID, or a cell ID.

This is beneficial, since slice-support information can be obtained from a correlation of several information, in particular comprising one or more of the above named information.

In one embodiment, the apparatus further can be configured to receive information regarding a tracking area; and request the slice-support information based on the received information regarding the tracking area.

This is beneficial as further information can be obtained when a measurement report received from a UE comprises at least one tracking area with unknown slice-support information.

In one embodiment, the request for the slice-support information and/or the slice-context information can comprise an address of an access node and a TA ID.

This allows for a "transparent mode" wherein the request is sent directly to a target base station via a core-network entity and/or a UE-relay without an established Xn interface. In this case, the response from the target access node can be sent also by using the same way. An example procedure for this implementation can be obtaining slice-support information and/or slice-context information in a configuration transfer procedure (3GPP TS38.413), e.g., utilizing self-organizing network (SON) configuration transfer Information Element. In this example procedure, address of an access node can include the ID of a source access node and the ID of a target access node.

In one embodiment, the apparatus can further be configured to store the slice-context information in a data base.

This ensures that slice-support information can be determined when sufficient slice-context information is available.

In one embodiment, the apparatus can further be configured to obtain and/or update the slice-context information based on the slice-support information which was directly received by the apparatus.

This ensures that new slice-context information can be derived based on the received slice-support information, which in turn can be used to determine further or more accurate or more recent slice-support information.

In one embodiment, the apparatus can further be configured to obtain and/or update the slice-context information by requesting information regarding at least one of a TAI, a TAI list, an access node ID, a S-NSSAI list, or a cell ID from an external information source.

In one embodiment, a method for obtaining slice-support information comprises the operations of receiving slice-support information; and/or receiving slice-context information and determining slice-support information based on the slice-context information; wherein the slice-support information comprises a mapping of a slice to an area, in particular a tracking area or a slice-support area; and processing a slice-related information based on the slice-support information.

In one embodiment, the method further can comprise requesting slice-support information and/or slice-context information, in particular from a network entity and/or a UE.

In one embodiment, the network entity can be an access-and-mobility management function, AMF, and/or an operations-and-management system, OMS.

In one embodiment, the slice-support information and/or the slice-context information can be received from a network entity, in particular via an N2 message.

In one embodiment, the slice-context information can comprise at least one of a slice support area, in particular a slice support area ID, a TAI list for a UE, an access node ID, or a cell ID.

In one embodiment, the method further can comprise receiving information regarding a tracking area; and requesting the slice-support information based on the received information regarding the tracking area.

In one embodiment, the request for the slice-support information and/or the slice-context information can comprise an address of an access node and a TA ID.

In one embodiment, the method can further comprise storing the slice-context information in a data base.

In one embodiment, the method can further comprise obtaining and/or updating the slice-context information based on the slice-support information which was directly received by the apparatus.

In one embodiment, the method can further comprise obtaining and/or updating the slice-context information by requesting information regarding at least one of a TAI, a TAI list, an access node ID, a S-NSSAI list, or a cell ID from an external information source.

The method of the second aspect and its implementation forms achieve the same advantages as the apparatus of the first aspect and its respective implementation forms.

In one embodiment, an apparatus for an access-and-mobility management function (AMF), and/or an operations-and-management system (OMS) is configured to transmit slice-support information; and/or transmit slice-context information; wherein the slice-support information comprises a mapping of a slice to an area, in particular a tracking area or a slice-support area.

This ensures that sufficient information can be provided to an access node, to determine which slice is available in which area can be obtained.

In one embodiment, the apparatus further can be configured to receive a request for slice-support information and transmit the slice-support information according to the received request for slice-support information; and/or receive a request for slice-context information and transmit the slice-context information according to the received request for slice-context information.

This ensures that slice-support information can be provided to an access node when it is needed.

In one embodiment, the apparatus can further be configured to transmit slice-support information via an N2 message; and/or transmit slice-context information via an N2 message.

In particular, this ensures that slice-support information can be obtained from a new N2 aka NG2 message or signal, or by using the fields of an existing N2 aka NG2 message or signal, or by adding new information element fields to an existing N2 aka NG2 message or signal.

In one embodiment, the slice-context information can comprise at least one of a slice support area, in particular a slice support area ID, a TAI list for a UE, an access node ID, or a cell ID.

This is beneficial, since in an access node that is receiving the above information, slice-support information can be obtained from a correlation of different kinds of information, in particular from one or more of the above named information.

In one embodiment, a method for operating an apparatus for an access-and-mobility management function (AMF), and/or an operate-and-management system (OMS) comprises the operations of transmitting slice-support information; and/or transmitting slice-context information; wherein the slice-support information comprises a mapping of a slice to an area, in particular a tracking area or a slice-support area.

In one embodiment, the method further can comprise receiving a request for slice-support information and transmitting the slice-support information according to the received request for slice-support information; and/or receiving a request for slice-context information and transmitting the slice-context information according to the received request for slice-context information.

In one embodiment, the method can further comprise transmitting slice-support information via an N2 message; and/or transmitting slice-context information via an N2 message.

In one embodiment, the slice-context information can comprise at least one of a slice support area, in particular a slice support area ID, a TAI list for a UE, an access node ID, or a cell ID.

The method achieves the same advantages as the apparatus for AMF and/or OMS described above.

In one embodiment, a system for obtaining slice-support information comprises the apparatus for an access node, and the apparatus for AMF and/or OMS.

The system achieves the same advantages as the apparatus for an access node and the apparatus for AMF and/or OMS.

It has to be noted that all devices, elements, units and means described in the present application could be implemented in the software or hardware elements or any kind of combination thereof. All operations which are performed by the various entities described in the present application as well as the functionalities described to be performed by the various entities are intended to mean that the respective entity is adapted to or configured to perform the respective operations and functionalities. Even if, in the following description of specific embodiments, a specific functionality or operation to be performed by external entities is not reflected in the description of a specific detailed element of that entity which performs that specific operation or functionality, it should be clear for a skilled person that these methods and functionalities can be implemented in respective software or hardware elements, or any kind of combination thereof.

BRIEF DESCRIPTION OF DRAWINGS

The above described aspects and implementation forms of the present invention will be explained in the following description of specific embodiments in relation to the enclosed drawings, in which.

DETAILED DESCRIPTION OF EMBODIMENTS

Figure 1:
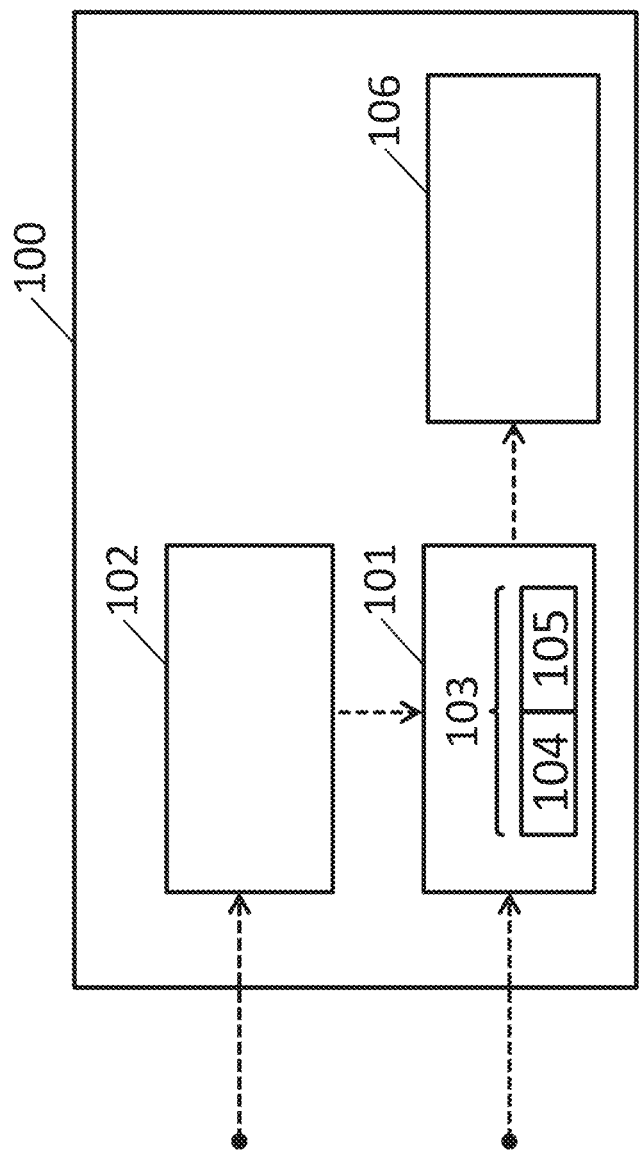
FIG. 1 shows an apparatus for an access node according to an embodiment of the present invention.

FIG. 1 shows an apparatus 100 for an access node (which can also be referred to as node) according to an embodiment of the present invention. An access node can in particular be a RAN, a UE-relay or a gNB. According to the present invention, a methodology and a procedure to efficiently obtain slice-support information 101 of neighboring cells in tracking area (TA) granularity are provided by the apparatus 100. A TA can in particular be regarded as a list of cells.

Two different methods can be used for this purpose. The first method—which is going to be referred to as method 1a—aims at getting slice-support information 101 per TA of a neighbor cell directly. To this end, the apparatus 100 is configured to receive slice-support information 101 and/or receive slice-context information 102 and determine slice-support information 101 based on the slice-context information 102. This can be regarded as a proactive way of obtaining the slice-support information 101, in which an information source (e.g. an AMF or OMS) distributes the slice-support information 101 or the slice-context information 102 to an access node that implements the apparatus 100.

In other words, in method 1a, a network entity proactively distributes slice-support information 101 and/or slice-context information 102 of a TA to a radio node, where such information is needed (e.g. to a serving gNB of a UE). The network entity can be either a core network control plane entity (e.g. an AMF) or a network management entity (e.g. an OMS).

In case of an AMF, the slice-support information 101 and/or the slice-context information 102 of another TA or node can be carried in NG signaling (e.g. N2 aka NG2 message) from a NextGen Core (NGC) to the NG RAN node. NG generally can be regarded as the interface between a gNB and a NextGen Core.

NG signaling can be a response message of any request from a RAN to an NGC. The NG signaling can also be the signaling originated from an NGC to a RAN e.g. a handover request from an AMF to a target RAN node to indicate the slice-support information 101 of a source RAN node in case of an NG-based handover. In another example, the NGC sends the slice-support information 101 of a TA to a selected RAN node or all RAN nodes in a same Tracking Area ID (TAI) list. In this case, the TA is a TA that is not in a supported TA list of a current RAN node. The selected RAN node refers to the node which is different from the current RAN node.

More specifically, the slice-support information 101 and/or the slice-context information 102 can be received via an N2 message. This can either be a dedicated N2 message or via piggybacking on an N2 message that is used for another purpose.

In particular, the slice-support information 101 of the above example can include an S-NSSAI list as specified by 3GPP. An NSSAI is a Network Slice Selection Assistance Information, wherein an S-NSSAI is a Single NSSAI.

More specifically, an NG RAN node can include both a gNB and/or an enhanced LTE (eLTE), i.e., 3GPP Release 15 and onwards, access node. In the whole document, examples in which a gNB is used can also be implemented by using an NG RAN node instead.

Further, the slice-support information 101 received or obtained by the apparatus 100 comprises a mapping 103 of a slice 104 to an area 105, in particular a tracking area or a slice-support area. A slice support area can in particular be a list of cells, wherein the slice support is the same in these cells.

In order to allow for network slicing, the apparatus 100 is further configured to process a slice-related information 106 based on the slice-support information 101. A slice-related information can in particular be any information related to a slice. In other words, the apparatus 100 is not only configured to exclusively receive slice-support information 101 and/or slice-context information 102, but also interpret the received information 101, 102, and process the slice-related information 106 accordingly. Processing the slice-related information 106 based on the slice-support information 101 can include any kind of processing information.

In one embodiment, the apparatus 100 can be configured to request the slice-support information 101 and/or the slice-context information 102, in particular from a network entity (which can be an AMF or an OMS) and/or a UE. This way of requesting the slice-support information 101 and/or the slice-context information 102 can also be regarded as method 1b. Method 1b can be considered a reactive way, in which a RAN node (e.g. a gNB) communicates an inquiry to an information source asking for the slice-support information 101 and/or the slice-context information 102. The inquiry can trigger several reports by defining the conditions for reporting (e.g. timing, interested S-NSSAI, TA, cell, etc.).

In other words, a RAN node can ask a UE to report a TA of a neighbor cell. If the slice-support information 101 of the reported TA is unknown for the RAN node, the RAN node can also request this information directly from a network entity such as an AMF or OMS (assuming that such information is known at the network entity). In case that such information is not available at the network entity, the network entity can either indicate that such information is not available there, or redirect to some other network entity where such information is available (e.g. another AMF or OMS). Furthermore, the request for a certain TA or TAs can be, e.g., in the form of a RAN configuration update message like in TS 38.413, where the TAs with known slice support information (e.g., TAs supported by the RAN node) and TAs with unknown slice support information (e.g., newly discovered TAs) can be included. Here, a similar format of, e.g., supported TAs information element (IE) as in TS 38.413, can be utilized.

The apparatus 100 is configured to receive slice-context information 102. In one embodiment, this slice-context information 102 can comprise at least one of: a slice support area, in particular a slice support area ID, a TAI list for a UE, an access node ID, or a cell ID. A slice support area can e.g. be a location area (relating to GSM), a routing area (relating to UMTS), or a tracking area (relating to LTE). To allow for further processing of the slice-context information 102, the apparatus 100 further can be configured to store the slice-context information 102 in a database.

The apparatus 100 can be configured to obtain and/or update the slice-context information 102 based on the slice-support information 101 which was directly received by the apparatus 100.

In one embodiment, the apparatus 100 can be configured to obtain and/or update the slice-context information 102 by requesting information regarding at least one of a TAI, a TAI list, an access node ID, an S-NSSAI list, or a cell ID from an external information source (e.g. applications and network data analytic module).

By processing the slice-context information 102, e.g. by making use of at least one correlation between a TAI, a TAI list, a gNB ID, or a S-NSSAI list, the apparatus 100 can derive slice-support information 101, preferably per TA. This can be regarded as method 2. Method 2 includes a way to build correlations between the slice-context information 102, and a procedure to derive the slice-support information 101 based on the existing slice-context information 102. The slice-context information 102 can be obtained as described in method 1a and 1b.

Further, based on existing slice-context information 102 (i.e. which was distributed/retrieved before), a RAN node can check at first whether needed slice-support information 101 can already be derived from the existing slice-context information 102, according to method 2. If not possible, the RAN node can send an explicit request to ask for the missing information. The missing information can be either the slice-support information 101 (method 1a or 1b) itself or the slice-context information 102, which can help to derive the slice-support information 101.

Figure 2:
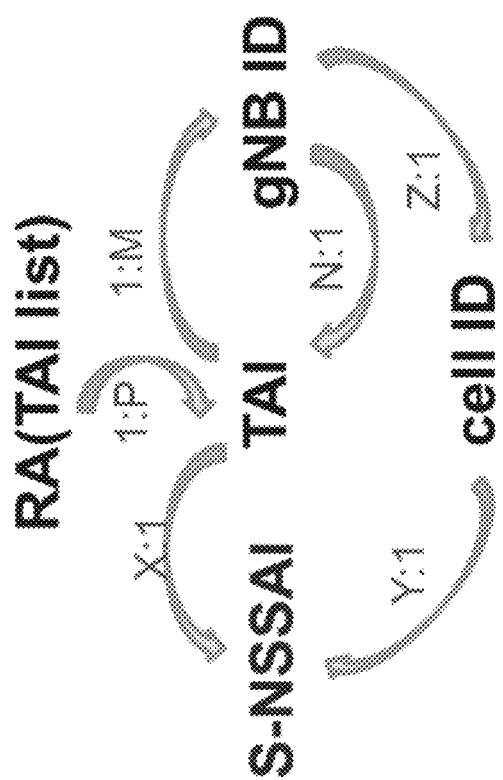
FIG. 2 shows an example operating manner of the apparatus.

As it is now going to be described in view of FIG. 2, the slice-support information 101 of a predefined TA can be derived via processing of slice-context information 102. That is, FIG. 2 shows an example operating manner of the apparatus 100 for an access node according to an embodiment of the present invention.

Many pieces of information can be correlated to each other in a wireless communication network in general, and by the apparatus 100 in particular. For instance:

A RAN node knows a TA it can support and also slice-support information 101 of a TA.

A Core Network (CN) node knows a RAN node it can connect to, a TA supported by each of the connected RAN nodes and also slice-support information 101 of each TA.

A RAN node knows a TA to RAN node mapping of itself and possibly also a TA to RAN node mapping of neighbor cells (e.g. reported by a UE).

A RAN node knows a cell to TA mapping of itself.

Slice support (i.e. an allowed NSSAI for one UE) should be the same for TAs in a same registration area (TAI list) of a UE.

Slice support of cells in a same TA should be the same.

Such data correlation (as it is e.g. show in FIG. 2) can be used to convert between different pieces of slice-support information 101 and/or slice-context information 102 (e.g. per node, per TA, per cell) and derive slice-support information 101 of a predefined TA by data processing.

Procedures to derive slice-support information 101 of a predefined TA are given in the following:

System procedure (which involves a network entity such as an AMF or OMS):

Operation 1: Slice related information (e.g. slice-support information 101 and/or slice-context information 102) is distributed to and retrieved by a node (using e.g. method 1a or 1b) where the respective information is required.

Operation 2: Each piece of information is updated independently by an own procedure. E.g. a TAI list is updated using a non-access stratum (NAS) procedure when a UE crosses a boundary of a registration area. Slice support of a RAN node can be updated by a gNB configuration update procedure.

Node procedure (which involves the access node using the apparatus 100):

Operation 1 builds a correlation between the respective information. Examples are e.g. shown in FIG. 2. E.g. one TAI maps to x S-NSSAIs, i.e. one fixed S-NSSAI list; or one RAN node maps to a fixed list of TAs; or a TA in the same TAI list guarantees support of the accepted S-NSSAI of the UE, etc. This step includes also a procedure to obtain slice-context information 102. For instance, a serving gNB gets a TAI list of a UE as part of a session setup request from the NGC.

Operation 2 complements an information base (i.e. the database) using the correlation between the pieces of information. E.g. a RAN node keeps a list of neighboring RAN node IDs, where each neighbor RAN node ID maps to a list of TAIs, and each TAI maps to a list of supported S-NSSAIs. In case that S-NSSAIs of a RAN node are missing completely or partially, the S-NSSAIs of that RAN node ID with the same TAIs can be used to build the S-NSSAI information or to complement the missing information.

Operation 3 updates the information base considering the data correlation in case of updated information provided by the system procedure.

Figure 3:
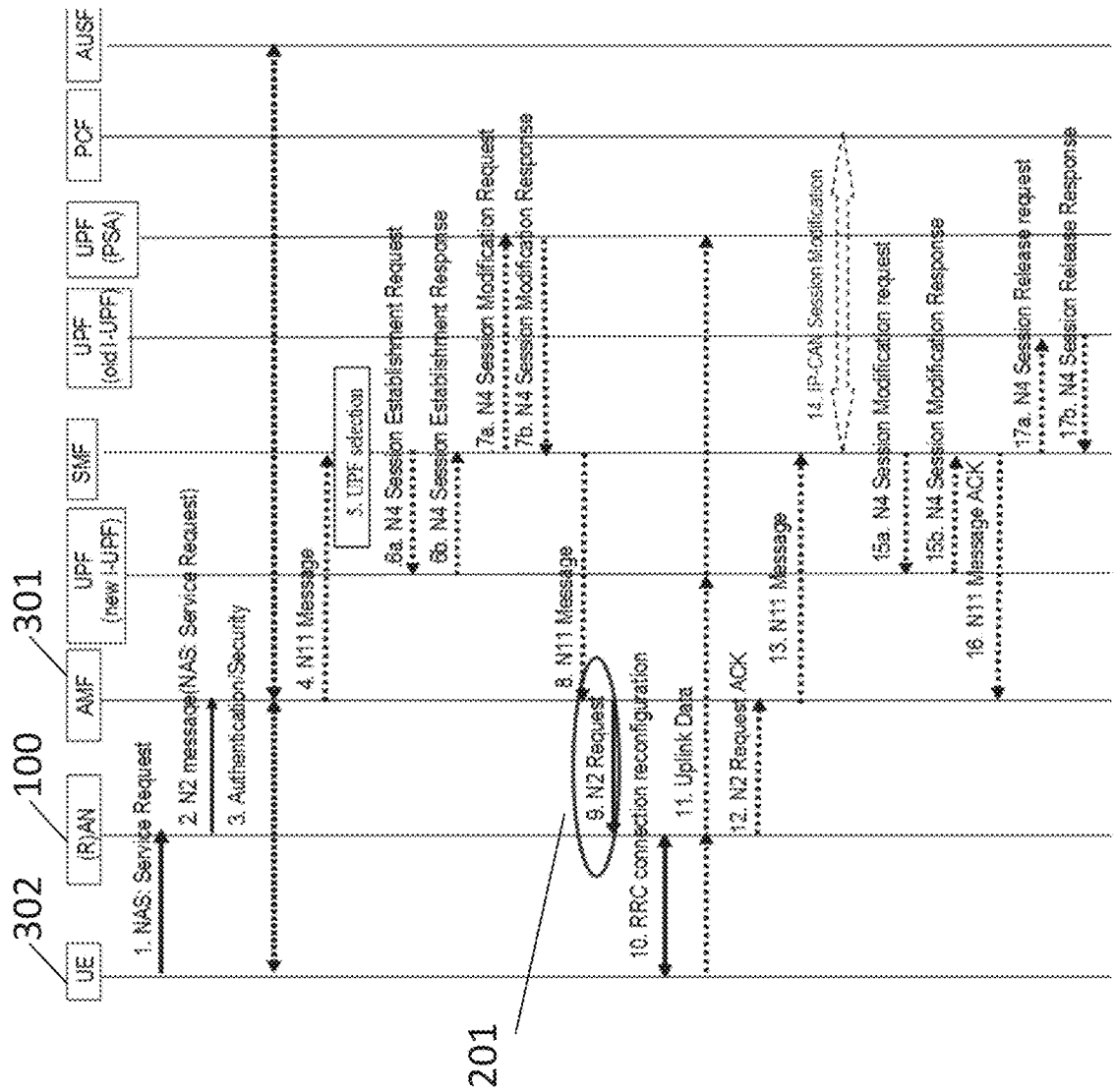
FIG. 3 shows another example operating manner of the apparatus.

FIG. 3 shows another operating manner of the apparatus 100 that is implementing method 1a. FIG. 3 in particular shows how a RAN node (which employs the apparatus 100) obtains slice-support information 101 and/or slice-context information 102 of a TA by distribution from a network entity 301, which is an AMF or OMS. FIG. 3 specifically shows an example of obtaining slice-support information 101 of a TA in a proactive way. Here the slice-support information 101 and/or the slice-context information 102 of a TA is sent to a UE serving RAN node (employing the apparatus 100) using NG signaling. In operation 9 201 of the UE triggered service request procedure, an N2 request carries the slice-support information 101 and/or the slice-context information 102 of all TAs related to this UE (e.g., TAs in UE TAI list, or TAs neighboring to the TAs in UE TAI list). Some TAs might not be supported by the current serving RAN node 100 of the UE 302, therefore the related slice-support information 101 and/or the slice-context information 102 is unknown for the serving RAN node 100.

In a case in which the network entity is an OMS, the slice-support information 101 of a TA or a node, can be carried in a RAN configuration or configuration update message from the OMS.

Figure 4:
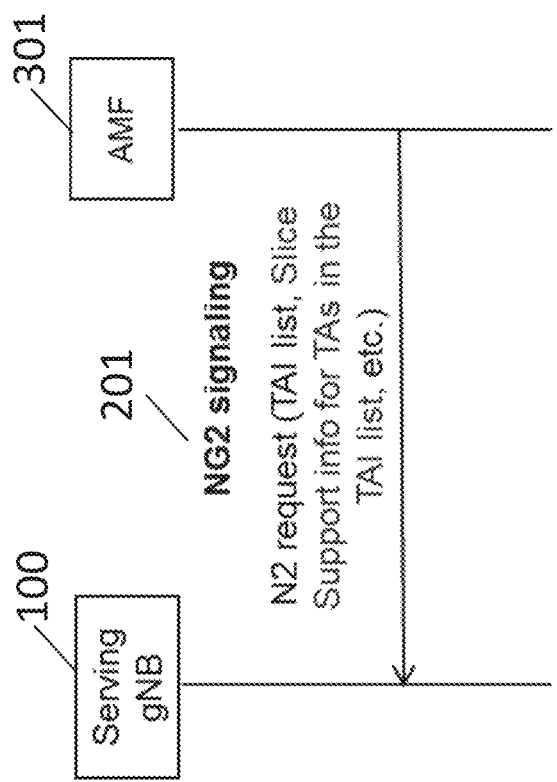
FIG. 4 shows another example operating manner of the apparatus.

FIG. 4 shows another operating manner of the apparatus 100. FIG. 4 in particular illustrates the N2 request of operation 9 201 in FIG. 3 in more detail. The N2 request that is transmitted by means of NG2 signaling (or NG signaling) can contain at least one of a TAI list, or slice-support information 101 for TAs in the TAI list and/or slice-support information for TA related to this UE which is not in the TAI list.

Figure 5:
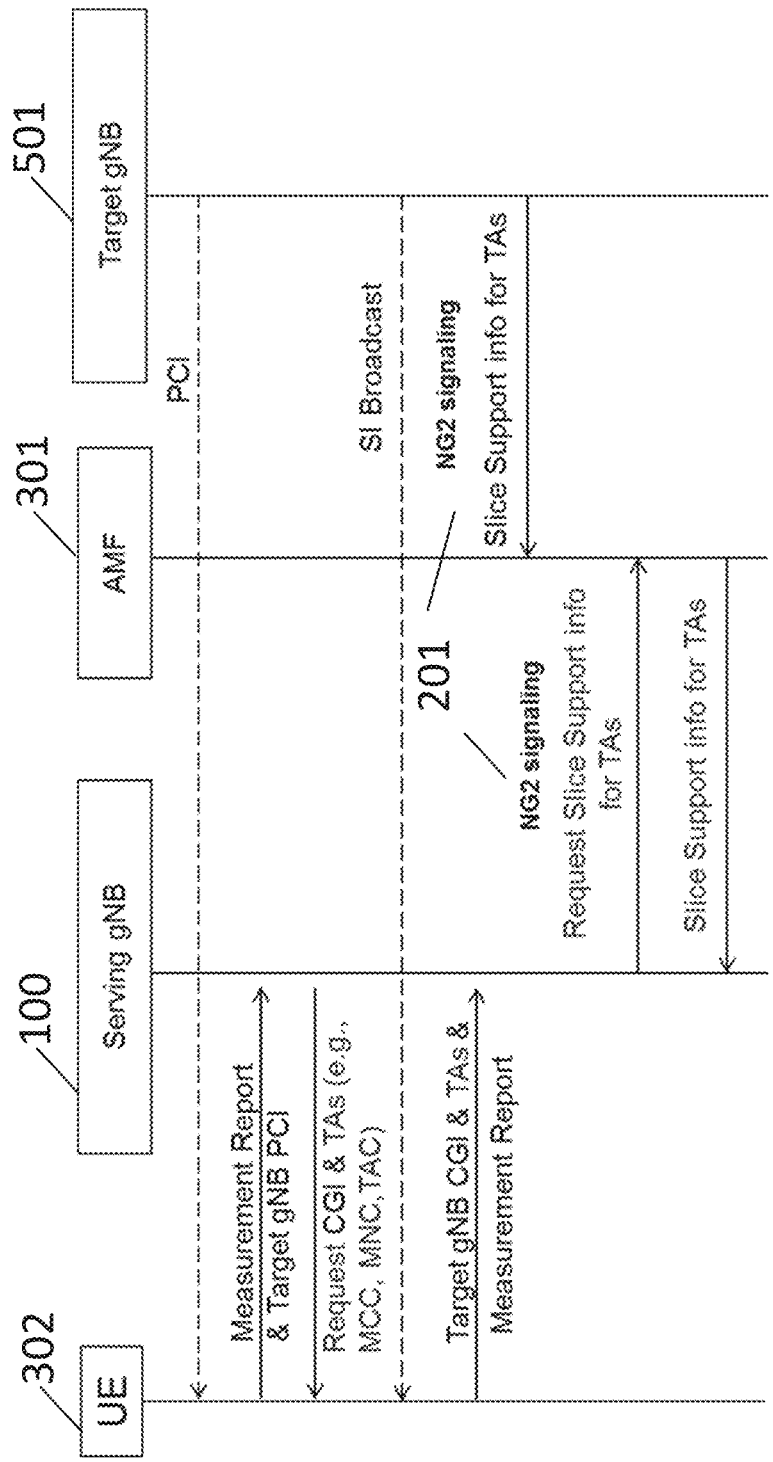
FIG. 5 shows another example operating manner of the apparatus.

FIG. 5 shows another operating manner of the apparatus 100 that is implementing method 1b. FIG. 5 in particular shows a RAN node that obtains slice-support information 101 and/or slice context information 102 of a TA reactively via an explicit request. FIG. 5 shows an example where the RAN node (i.e. a serving gNB that contains the apparatus 100) requests slice-support information 101 and/or slice-context information 102 of a TA from the network entity 301 (i.e. an AMF or OMS). In this example procedure, upon detection of a new possible target gNB 501 for a handover or upon detection of a new neighbouring TA where the slice information is unknown, the UE 302 is requested to decode also TA related information (e.g. Mobile Country Code—MCC, Mobile Network Code—MNC, and Tracking Area Code—TAC). The corresponding UE 302 reports the TA related information to the serving gNB. In this case, the serving gNB explicitly sends a request for a certain TA or TAs to the AMF/OMS, and the AMF/OMS will reply with the slice-support information 101 and/or slice-context information 102 of the requested TA or TAs.

Figure 6:
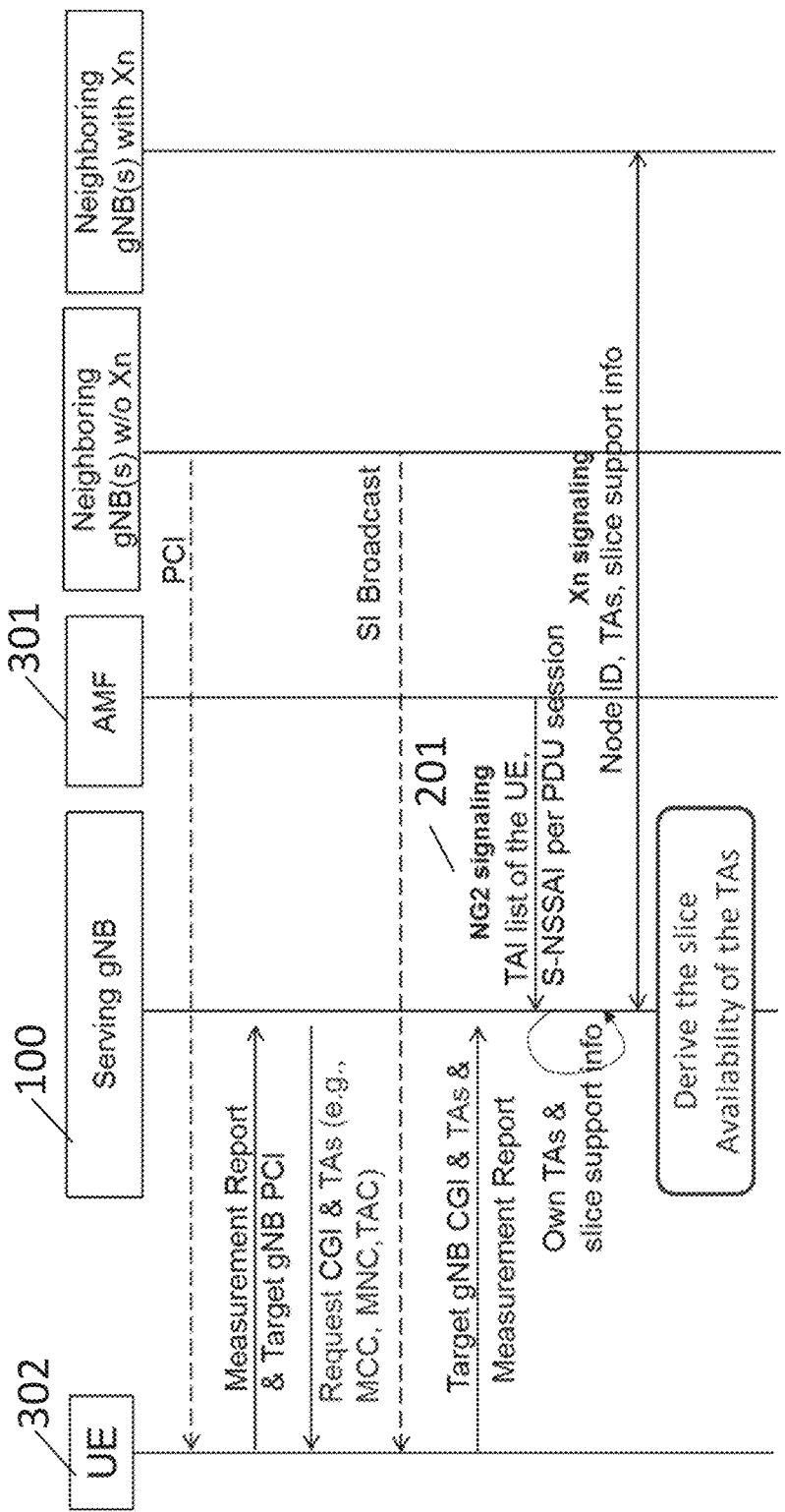
FIG. 6 shows another example operating manner of the apparatus.

FIG. 6 shows another operating manner of the apparatus 100. FIG. 6 in particular shows, how slice-support information 101 of a TA or new slice-context information 102 can be derived from slice-context information 102 in a database of the apparatus 100. FIG. 6 shows a general method of deriving slice-support information 101. The following specific use cases fall within the scope of the general method:

Use case 1: RAN node 1 knows the slice-support information 101 of RAN node 2, and RAN node 3 has the same TAI as RAN node 2. RAN node 1 can derive the slice-support information 101 of RAN node 3.

Use case 2: RAN node 1 knows that RAN node 2 is in the same TA. RAN node 1 can assume that RAN node 2 has the same slice support as itself for that TA. Use case 3: RAN node 1 knows RAN node 2 is in the TA of the same Registration Area/TAI list of the UE. RAN node 1 can assume that RAN node 2 can also support the slice(s) of that UE.

Figure 7:
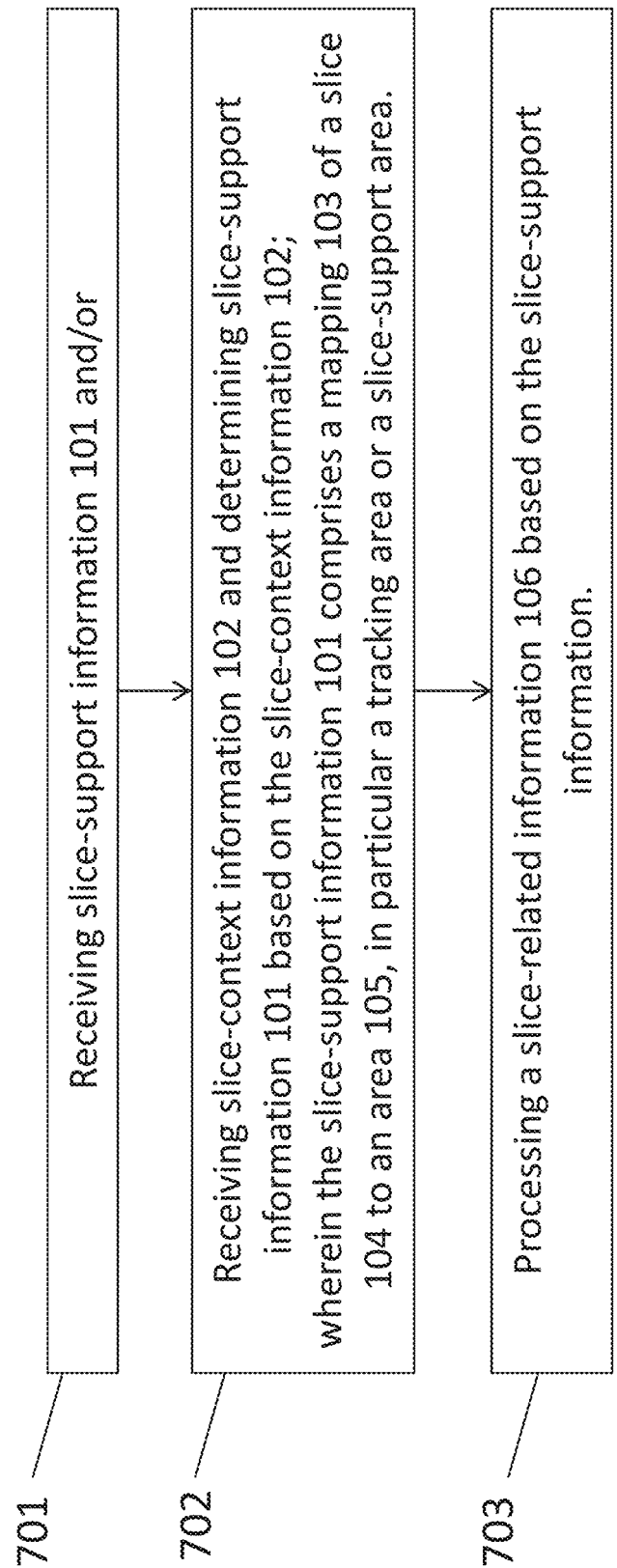
FIG. 7 shows a schematic overview of a method according to an embodiment of the present invention.

FIG. 7 shows a schematic overview of a method 700 for obtaining slice-support information 101 according to an embodiment of the present invention. The method 700 corresponds to the apparatus 100 of FIG. 1, and is accordingly for operating the apparatus 100.

The method 700 comprises an operation of receiving 701 slice-support information 101. Additionally or alternatively, the method 700 comprises an operation of receiving 702 slice-context information 102 and determining slice-support information 101 based on the slice-context information 102; wherein the slice-support information 101 comprises a mapping 103 of a slice 104 to an area 105, in particular a tracking area or a slice-support area. The method 700 comprises a last operation of processing 703 a slice-related information 106 based on the slice-support information 101.

Figure 8:
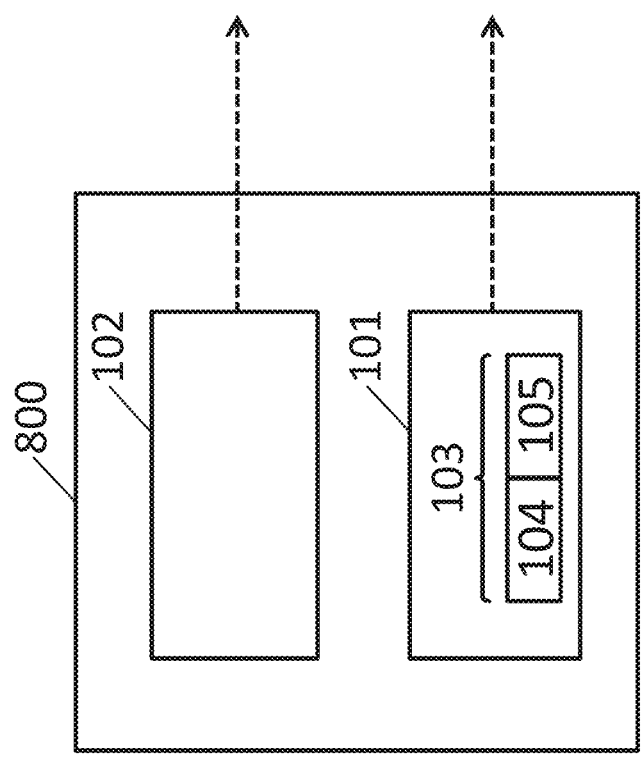
FIG. 8 shows an apparatus for an AMF and/or an OMS according to an embodiment of the present invention.

FIG. 8 shows an apparatus 800 for an AMF and/or an OMS according to an embodiment of the present invention. To provide the apparatus 100 with the desired information, the apparatus 800 is configured to transmit slice-support information 101 and/or transmit slice-context information 102. The transmitted slice-support information 101 comprises a mapping 103 of a slice 104 to an area 105, in particular a tracking area or a slice-support area. The slice-support information 101 and/or the slice-context information 102 provided by the apparatus 800 in particular comprises all features and functionality of the slice-support information 101 and the slice-context information 102 as described above.

Figure 9:
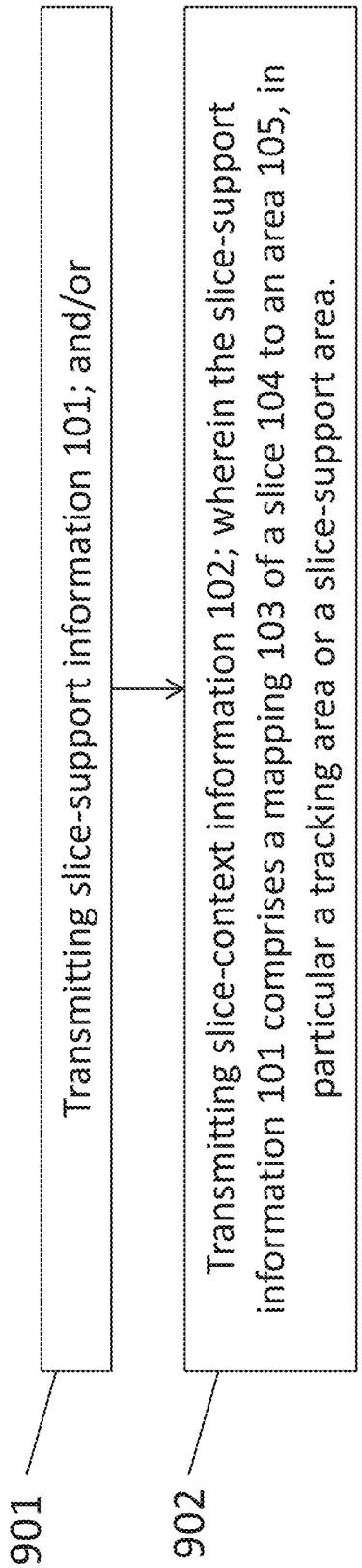
FIG. 9 shows a schematic overview of a method according to an embodiment of the present invention.

FIG. 9 shows a schematic overview of a method 900 for operating an apparatus for an AMF, and/or an OMS according to an embodiment of the present invention. The method 900 corresponds to the apparatus 800 of FIG. 8, and is accordingly for operating the apparatus 800.

The method 900 comprises an operation of transmitting 901 slice-support information 101. Additionally or alternatively, the method 900 comprises an operation of transmitting 902 slice-context information 102, wherein the slice-support information 101 comprises a mapping 103 of a slice 104 to an area 105, in particular a tracking area or a slice-support area.

Figure 10:
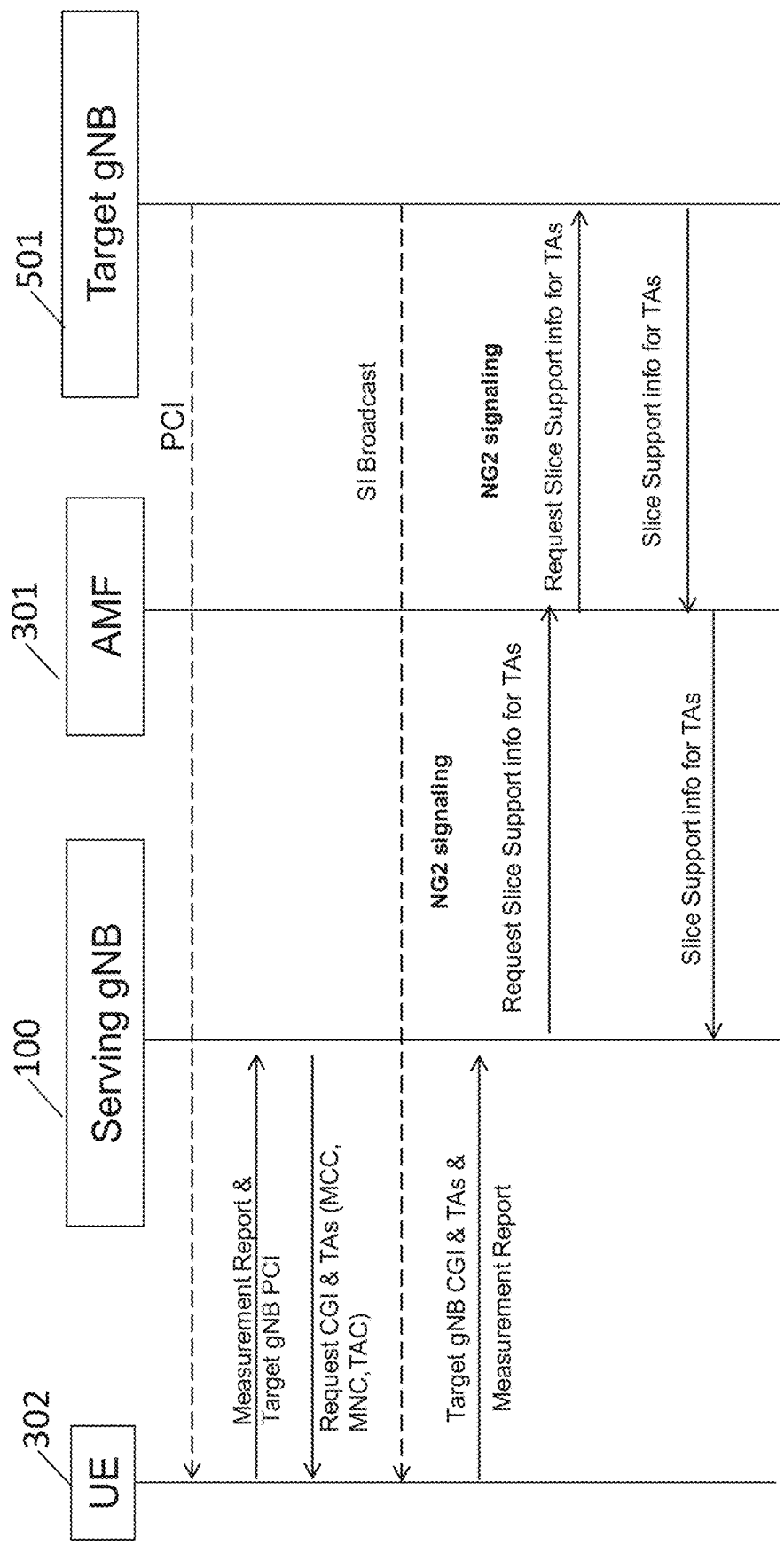
FIG. 10_shows a signaling diagram according to one embodiment of the invention, in particular for operation of the transparent mode.

FIG. 10 shows another operating manner of the apparatus 100 that is implementing method 1b with a transparent mode. FIG. 10 in particular shows a RAN node that obtains slice-support information 101 and/or slice context information 102 of a TA or TAs reactively via an explicit request. FIG. 10 shows an example where the RAN node (i.e. a serving gNB that contains the apparatus 100) requests slice-support information 101 and/or slice-context information 102 of a TA or TAs from a new possible target gNB 501, wherein this request is transferred via the network entity 301 (i.e. an AMF or OMS). In this procedure, upon detection of a new neighbouring TA, where the slice-support information is unknown, the UE 302 is requested to decode also TA related information (e.g. MCC, MNC, and TAC). The corresponding UE 302 reports the TA related information to the serving gNB. In this case, the AMF/OMS transfers the request to the target gNB based on the target gNB ID. The target gNB ID will reply with the slice-support information 101 and/or slice-context information 102 of the requested TA or TAs, and this reply will be transferred via the AMF/OMS to the serving gNB. An example procedure for this implementation can be obtaining slice-support information and/or slice-context information in a configuration transfer procedure (3GPP TS38.413), e.g., utilizing self-organizing network (SON) configuration transfer Information Element.

Figure 11:
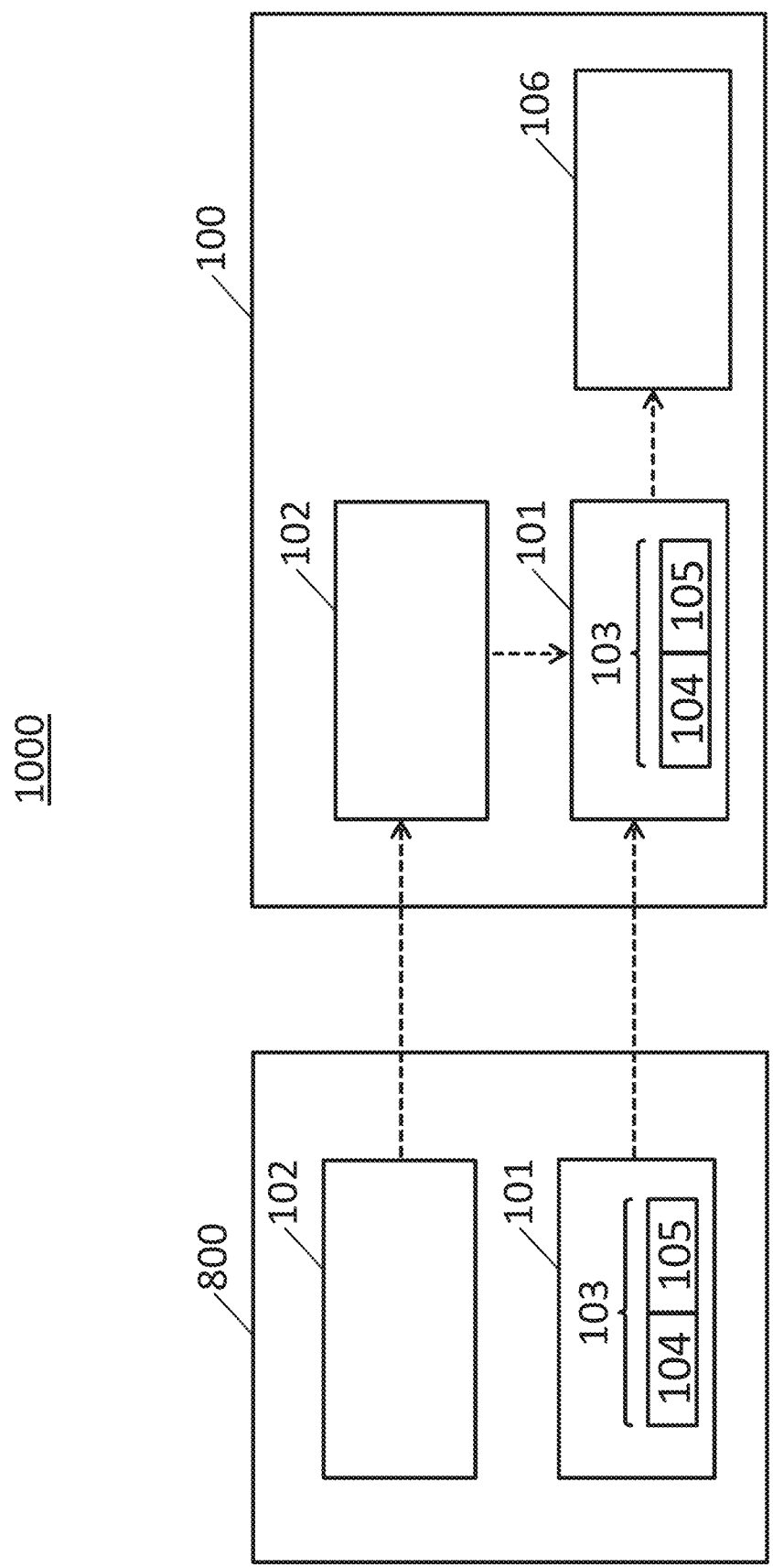
FIG. 11_shows a system according to an embodiment of the present invention.
Figure 12:
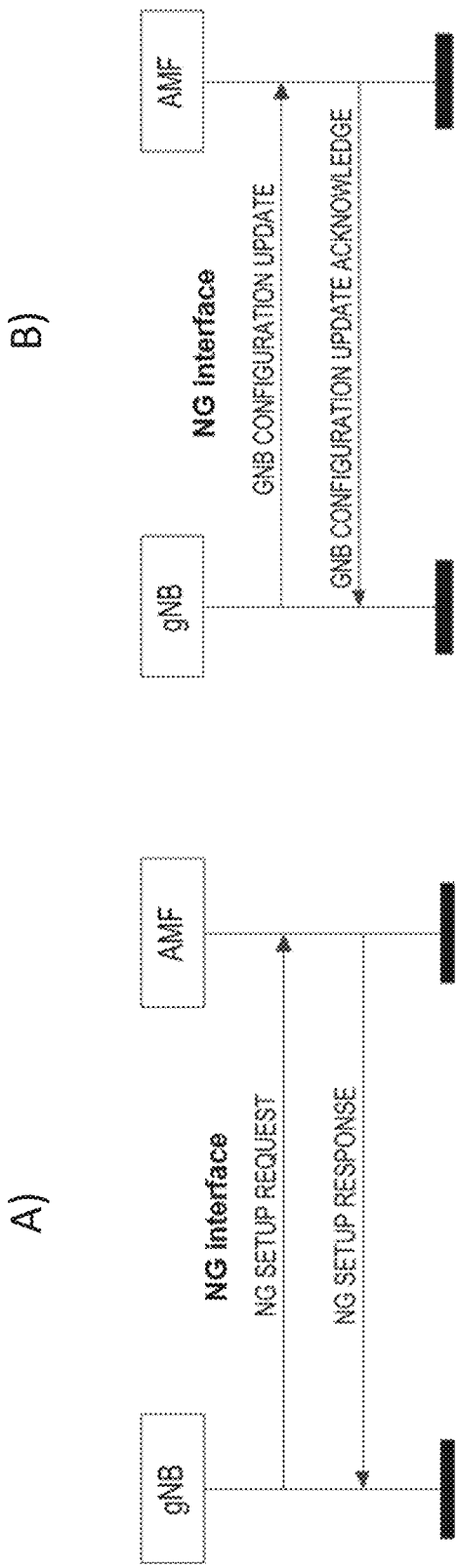
FIG. 12_shows a manner of processing slice information according to the prior art.

FIG. 11 shows a system 1000 according to an embodiment of the present invention. In particular, the system 1000 is a wireless communication system according to 3GPP for obtaining slice-support information, and comprises the apparatus 100 and the apparatus 800.

According to this invention, gNBs are made aware of the slice-support information 101 of neighbor cells in TA granularity, even without the existence of an Xn interface. This can help the serving gNB to make an optimal handover (HO) decision and in turn reduce the HO failure ratio and improve the UE experience. Besides, this invention proposes a method for neighbor cell slice availability awareness by combining all available related slice-context information 102 (per TA or per node based on slice-support information 101). This guarantees minimal signaling overhead and latency and in turn further improves the user experience and also the network efficiency.

The present invention has been described in conjunction with various embodiments as examples as well as implementations. However, other variations can be understood and effected by those persons skilled in the art and practicing the claimed invention, from the studies of the drawings, this disclosure and the independent claims. In the claims as well as in the description the word "comprising" does not exclude other elements or operations and the indefinite article "a" or "an" does not exclude a plurality. A single element or other unit may fulfill the functions of several entities or items recited in the claims. The mere fact that certain measures are recited in the mutual different dependent claims does not indicate that a combination of these measures cannot be used in an advantageous implementation.

What is claimed is:

1. A first radio access network (RAN) node, comprising:
a processor; and
a memory coupled to the processor and storing program instructions, which, when executed by the processor, cause the first RAN node to perform operations comprising:
receiving slice-context information of a neighboring cell of the first RAN node from a network entity, wherein the neighboring cell of the first RAN node is a cell that is of a second RAN node, and that neighbors one or more cells of the first RAN node, wherein the first RAN node is a serving RAN node to a user equipment (UE), wherein the second RAN node is a target RAN node of the first RAN node in a handover procedure, wherein the slice-context information comprises a slice support area ID, a tracking area identity (TAI) list for the UE, an access node ID, or a cell ID;
determining slice-support information based on the slice-context information, wherein the slice-support information comprises a mapping of a slice to an area, wherein the area comprises a tracking area or a slice-support area; and
processing a slice-related information based on the slice-support information.

2. The first RAN node according to claim 1, wherein the network entity comprises one of the following: an access-and-mobility management function (AMF), an operations-and-management system (OMS), or a third access node.

3. The first RAN node according to claim 1, wherein the operations further comprise:
receiving information regarding the tracking area; and
requesting the slice-support information based on the information regarding the tracking area.

4. The first RAN node according to claim 1, wherein the operations further comprise:
storing the slice-context information in a database.

5. The first RAN node according to claim 1, wherein the operations further comprise:
obtaining or updating the slice-context information based on slice-support information which was directly received by the first RAN node.

6. The first RAN node according to claim 1, wherein the operations further comprise:
obtaining or updating the slice-context information by requesting information regarding at least one of a TAI, the TAI list, the access node ID, a single network slice selection assistance Information (S-NSSAI) list, or the cell ID from an external information source.

7. The first RAN node according to claim 2, wherein the slice-context information is requested from one of the following: the network entity, the UE, or the third access node via the network entity.

8. The first RAN node according to claim 7, wherein a request for the slice-context information from the network entity, the UE or the third access node comprises an ID of the first RAN node, an ID of the third access node, and an ID of the tracking area.

9. A method for obtaining slice-support information, comprising:
receiving, by a first radio access network (RAN) node, slice-context information of a neighboring cell of the first RAN node from a network entity, wherein the neighboring cell of the first RAN node is a cell that is of a second RAN node, and that neighbors one or more cells of the first RAN node, wherein the first RAN node is a serving RAN node to a user equipment (UE), wherein the second RAN node is a target RAN node of the first RAN node in a handover procedure, wherein the slice-context information comprises a slice support area ID, a tracking area identity (TAI) list for the UE, an access node ID, or a cell ID;
determining the slice-support information based on the slice-context information, wherein the slice-support information comprises a mapping of a slice to an area, wherein the area comprises a tracking area or a slice-support area; and
processing a slice-related information based on the slice-support information.

10. The method according to claim 9, wherein the network entity comprises one of the following: an access-and-mobility management function (AMF), an operations-and-management system (OMS), or a third access node.

11. The method according to claim 9, further comprising:
receiving information regarding the tracking area; and
requesting the slice-support information based on the information regarding the tracking area.

12. The method according to claim 9, further comprising:
storing the slice-context information in a database.

13. The method according to claim 9, further comprising:
obtaining or updating the slice-context information based on slice-support information which was directly received by the first RAN node.

14. The method according to claim 9, further comprising: obtaining or updating the slice-context information by requesting information regarding at least one of the TAI, the TAI list, the access node ID, a single network slice selection assistance Information (S-NSSAI) list, or the cell ID from an external information source.

15. The method according to claim 9, wherein the slice-context information is requested from one of the following: a second network entity, the UE, or a third access node via the network entity.

16. The method according to claim 15, wherein a request for the slice-context information from the network entity, the UE or the third access node comprises an ID of the first RAN node, an ID of the third access node, and an ID of the tracking area.

17. An access-and-mobility management function (AMF), or an operations-and-management system (OMS), comprising:
a processor; and
a memory coupled to the processor and storing program instructions, which when executed by the processor, cause the AMF or the OMS to perform operations comprising:
transmitting slice-context information of a neighboring cell of a first radio access network (RAN) to the first RAN node, wherein the neighboring cell of the first RAN node is a cell that is of a second RAN node, and that neighbors one or more cells of the first RAN node, wherein the first RAN node is a serving RAN node to a user equipment (UE), wherein the second RAN node is a target RAN node of the first RAN node in a handover procedure, wherein the slice-context information comprises a slice support area ID, a tracking area identity (TAI) list for the UE, an access node ID, or a cell ID, and is used by the first RAN node to determine slice-support information, wherein the slice-support information comprises a mapping of a slice to an area, wherein the area comprises a tracking area or a slice-support area.

18. A method for operating a network entity that is an access-and-mobility management function (AMF) or an operations-and-management system (OMS), the method comprising:
transmitting, by the network entity, slice-context information of a neighboring cell of a first radio network access (RAN) node to the first RAN node, wherein the neighboring cell of the first RAN node is a cell that is of a second RAN node, and that neighbors one or more cells of the first RAN node, wherein the first RAN node is a serving RAN node to a user equipment (UE), wherein the second RAN node is a target RAN node of the first RAN node in a handover procedure, wherein the slice-context information comprises a slice support area ID, a tracking area identity (TAI) list for the UE, an access node ID, or a cell ID, and is used by the first RAN node to determine slice-support information;
wherein the slice-support information comprises a mapping of a slice to an area, wherein the area comprises a tracking area or a slice-support area.

19. A system for obtaining slice-support information, comprising:
a first radio network access (RAN) node with a first processor and a first memory;
a network entity with a second processor and a second memory; and
wherein the first memory coupled to the first processor of the first RAN node and storing program instructions, which when executed by the first processor, cause the first RAN node to perform operations comprising:
receiving slice-context information of a neighboring cell of the first RAN node from an access-and-mobility management function (AMF) or an operations-and-management system (OMS), wherein the neighboring cell of the first RAN node is a cell that is of a second RAN node, and that neighbors one or more cells of the first RAN node, wherein the first RAN node is a serving RAN node to a user equipment (UE), wherein the second RAN node is a target RAN node of the first RAN node in a handover procedure, wherein the slice-context information comprises a slice support area ID, a tracking area identity (TAI) list for the UE, an access node ID, or a cell ID,
determining the slice-support information based on the slice-context information, wherein the slice-support information comprises a mapping of a slice to an area, wherein the area comprises a tracking area, and
processing a slice-related information based on the slice-support information; and
wherein the second memory coupled to the second processor of the network entity and storing program instructions, which when executed by the second processor, cause the network entity to perform operations comprising:
transmitting the slice-context information of the neighboring cell to the first RAN node.

* * * * *